United States Patent [19]
Homan

[11] Patent Number: 5,246,052
[45] Date of Patent: Sep. 21, 1993

[54] AWNING HOOK

[75] Inventor: Thomas H. Homan, Homosassa, Fla.

[73] Assignee: Valterra Products, Inc., San Fernando, Calif.

[21] Appl. No.: 986,347

[22] Filed: Dec. 7, 1992

[51] Int. Cl.⁵ .............................................. E04F 10/00
[52] U.S. Cl. .................................... 160/65; 160/46; 160/67; 135/89
[58] Field of Search ................ 160/46, 65, 66, 67, 160/68, 70; 248/499; 135/89

[56] References Cited

U.S. PATENT DOCUMENTS

| | | | |
|---|---|---|---|
| 3,263,735 | 8/1966 | Vecchiarelli et al. | 160/67 X |
| 3,327,724 | 6/1967 | Nielsen | 160/46 X |
| 4,598,847 | 7/1986 | Ames, III | 248/499 X |
| 4,640,332 | 2/1987 | Turner | 160/65 X |
| 5,171,056 | 12/1992 | Faludy et al. | 160/67 X |

Primary Examiner—Blair M. Johnson
Attorney, Agent, or Firm—Rapkin, Gitlin & Moser

[57] ABSTRACT

A generally arcuate shaped device having a unitary construction, including an arcuate main section, which contains a hook element at the distal end and a generally straight proximal end section with an aperture formed therein. The device, which is placed over roller tube in a circumferential fashion and wraps around the tube to a distance of approximately 50% of the tube's circumference in the limited area at each end of the tube where it connects, engages a groove having a distinct downward facing orientation at a point approximately 180° from the place where the proximal end of the device would naturally come to rest.

8 Claims, 1 Drawing Sheet

AWNING HOOK

BACKGROUND OF THE INVENTION

1. Field of the Invention

The present invention relates to awnings of the type usually mounted to the side of a recreational vehicle or a building, and more particularly to a device that aids in maintaining the awning fabric taut and gives added strength to the awning support frame.

2. Description of the Prior Art

Common in the prior art are retractable awnings that are mountable on recreational vehicles or buildings to protect against the elements, such as sun, rain, etc. Conventional technology provides an awning fabric that is wrapped around an elongated roller tube, which is extendable outward from the mounting surface, e.g. the side of a recreational vehicle, and is usually supported by one or more pairs of brace members. The problem with this arrangement is that the canopy fabric is usually unable to be drawn sufficiently taut. Thus, even on mildly windy days, this condition allows for the loose fabric to produce annoying flapping sounds. Canopies that are not drawn taut also look sloppy and generally unattractive.

Some awnings disclosed in the prior art are supported by only a single pair of braces, which normally extend from the mounting surface and are attached to each end of the roller tube. Understandably, with this arrangement, even the slightest amount of wind can cause the canopy to flip up and the assembly itself, including the individual support braces, to bend or break and, thus, suffer considerable damage in the process.

As stated, a second pair of braces is often used to give added support to the extended canopy. These braces are attached to the mounting surface at a point below the plane of the canopy and extend out at an angle to enable their ultimate connection, respectively, to the opposite ends of the roller tube. Under high wind conditions, such as those experienced in exposed wide open areas like the desert, where winds are capable of exerting a powerful force against the underside of the fabric and literally upending the canopy, even a reinforced canopy with two sets of brace supports can suffer considerable damage. Tie-down devices can also be employed to provide reinforcement of the assembly against such damage. These devices can take several forms, though usually they include a rope, strap or wire connected to each end of the roller tube and are then anchored, respectively, into the ground below. These devices, particularly the clamping or attachment mechanism on the ends, are often a bit too complex in their design and are usually too difficult to assemble and then disassemble when it becomes necessary to quickly roll up the canopy. Under severe weather conditions, even the combination of the two sets of braces and the tie-downs are not sufficient to prevent damage to the canopy and the entire support assembly. In these emergency situations, time is clearly of the essence. The extended canopy must quickly be disconnected from the tie-downs and then rolled up and folded against the side of the structure, e.g. the side of a recreational vehicle, to prevent destruction to the assembly. The concern over the destruction not only relates to the monetary loss resulting therefrom, but also to the potential danger and injury to the occupants of the vehicle or those outside the vehicle from the metal support members and/or the tie-down straps or cables that may be flailing about in the wind and strike someone.

The prior art includes a variety of canopy assemblies used in conjunction with tie-downs. However, as will be shown, neither the assemblies nor the tie-down devices have been successful in either addressing or resolving any of the significant problems described above.

An example is U.S. Pat. No. 4,640,332 to Turner ("332"), which discloses an awning support assembly mounted on a recreational vehicle, including a fabric canopy wrapped around a support tube. The ends of the two compression members are mounted to the side of the vehicle. The opposite ends of the members are then attached, respectively, to the corresponding end portions of the support tube. A second pair of brace members are used to support the canopy from below. A tie-down device assembled at either end of the support tube is also used and includes, at the top end of the device, a clamp assembly engageable with grooves or channels extending longitudinally along the sides of the support tube. The bottom of the tie-down includes a stake or similar device used to anchor the tie-down to the ground. A similar clamp assembly is attached to each of the outer ends of the compression members and engages the grooves in the same manner as the tie-down clamp assembly. When the tie-down clamps are secured to the grooves, the tie-down strap is then adjusted to achieve a certain degree of tightness and the canopy fabric is drawn taut. Levers operated to extend the compression members also assist in this regard.

Each of the clamp assemblies in Turner includes two elongated, arcuate members having hook-shaped distal ends which engage the support tube grooves. The proximal ends of each member form tabs, which are drawn together by any conventional fastener assembly, such as a thumb screw and a wing nut placed through a hole in each tab. All of the clamps appear to be designed this way and, when the wing nut is tightened, are securely attached to the support tube. This apparatus, particularly the clamp assemblies, are relatively complex in design and function and, in an emergency situation, when the need arises to quickly disassemble the tie-down and the support braces and roll up the canopy, the task will prove difficult and time consuming.

Examples of other related technologies include the devices and awning assemblies disclosed in U.S. Pat. Nos. 3,263,735; 3,327,724; 4,195,875; 5,094,285; 4,033,397 and 4,719,954.

The improvements embodied in the present invention resolve the many problems associated with the prior art devices. The ability to easily engage the grooves of the support or roller tube and draw the canopy fabric taut without the need for complex adjustments and fastening techniques, such as those involved with the device disclosed in the "332" patent, is a major feature of the present invention. Even more important is the feature that allows the device of the present invention to be easily and quickly disconnected from the roller tube when the need arises without the use of special levers or the need to disengage or loosen fastener assemblies, such as a nut and bolt combination or some similar mechanism. The device of the present invention includes an arcuate main section, which contains a hook element at the distal end and a generally straight proximal end section with an aperture therein. The device is placed over the roller tube in a circumferential fashion and wraps around the tube a distance of approximately 50% of the tube's circumference in the limited area at each end of the tube where it is connected. The hook engages a groove in the roller tube at a point approximately 180° from the place where the proximal end naturally comes to rest. Usually, the top end of the tie-down is attached to the aperture in the proximal end first and then the device is adjusted, if necessary, by extending the hook and then inserting it into the groove having a distinct normal orientation relative to the ground surface. Any slack in the canopy or the tie-down is usually eliminated with this adjustment. Another approach is to first engage the hook in the groove, as described, and then adjust the tie-down tightly to secure the entire assembly.

The moment any attempt is made to roll up the canopy, the hook will quickly drop out of the groove in a gravitational free fall to the ground. This will occur, for example, upon disengaging the tie-down ground anchor or loosening the tie-down in some other manner. Now, unlike the devices of the prior art, neither the device of the present invention nor the tie-down used in conjunction with it will become an impediment to the canopy winding up process.

SUMMARY OF THE INVENTION

The present invention provides a generally arcuate shaped device having a unitary construction fabricated of a light metal alloy or some other suitable material. The device includes an arcuate main section, which contains a hook element at the distal end and a generally straight proximal end section with an aperture formed therein. The device is placed over the roller tube in a circumferential fashion and wraps around the tube to a distance of approximately 50% of the tube's circumference in the limited area at each end of the tube where it connects. The hook engages a groove having a distinct downward facing orientation at a point approximately 180° from the place where the proximal end of the device naturally comes to rest. The usual sequence of assembly is to insert the top end of the tie-down into the proximal end aperture first. The hook is then inserted into a groove having a distinct normal or generally normal orientation to the ground. Any slack in the canopy or the tie-down is usually eliminated with this adjustment. Another approach is to first engage the hook in the approximately downward oriented groove, as described, and then adjust the tie-down tightly to secure the entire assembly. The moment any effort is made to roll up the canopy, the hook will easily slide from the groove in a gravitational free fall to the ground. This will occur, for example, upon reversing the rotation of the tube or upon disengaging the tie-down ground anchor or loosening the tie-down in some other manner. Unlike the devices of the prior art, neither the device of the present invention nor the tie-down used in conjunction with it will become an impediment to the canopy winding up process.

Accordingly, an object of the present invention is to provide a device which can quickly and easily engage a groove in a canopy roller tube to adjust the tube's rotation for maintaining the canopy in a taut condition.

Another object of the present invention is to provide a device which quickly and easily engages a groove in a canopy roller tube to increase the torque in the tube for maintaining the canopy in a taut condition.

Yet another object of the present invention is to provide a device which is adapted to engage a groove in a canopy roller tube by hooking the end of the device in the groove so that, upon reversing the tube's rotation, the hook end will immediately and without any complex disassemblage, disengage from the groove in a gravitational free fall.

Still yet another object of the present invention is to provide a device which is easy to use and inexpensive to manufacture.

Other objects and advantages of the present invention will become apparent in the following specifications when considered in light of the attached drawings wherein the preferred embodiment of the invention is illustrated.

DETAILED DESCRIPTION OF THE PREFERRED EMBODIMENT

Figure 1:
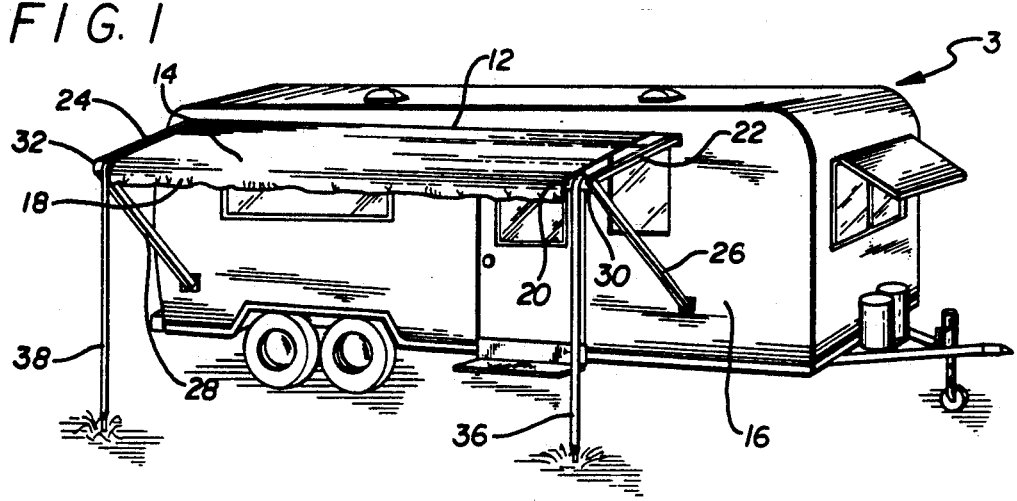
FIG. 1 is a perspective view of the device of the present invention employed in conjunction with an awning assembly mounted on a recreational vehicle.
Figure 2:
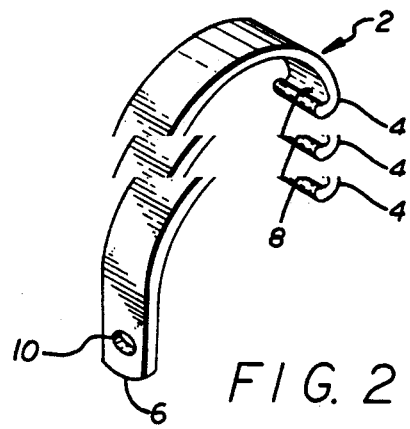
FIG. 2 is a perspective view of the device of the present invention.
Figure 3:
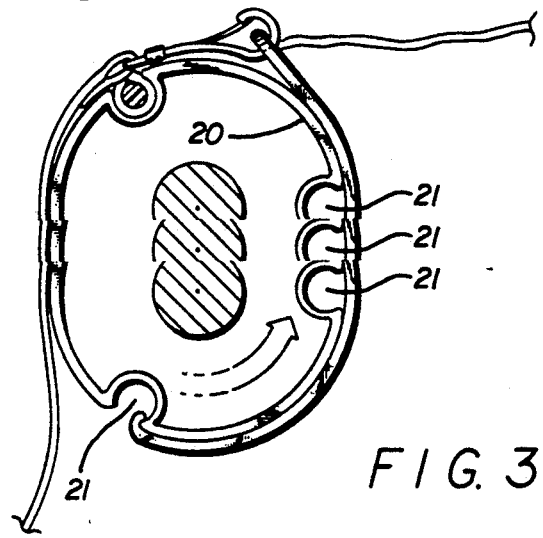
FIG. 3 is an end elevational view of the canopy roller tube engaged by the device of the present invention before rotation.
Figure 4:
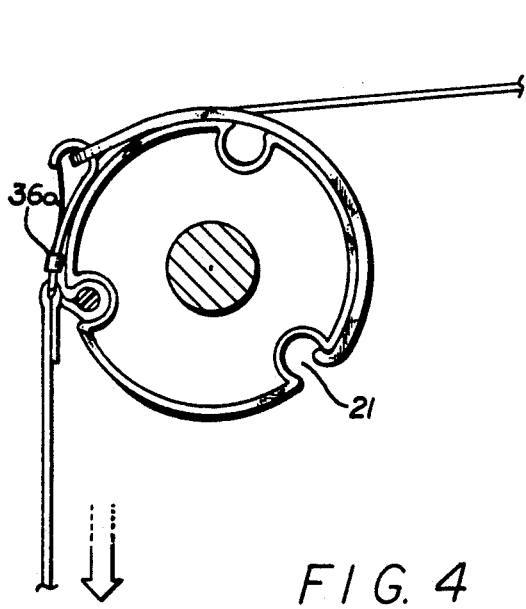
FIG. 4 is an end elevational view of the canopy roller tube engaged by the device of the present invention after rotation.
Figure 5:
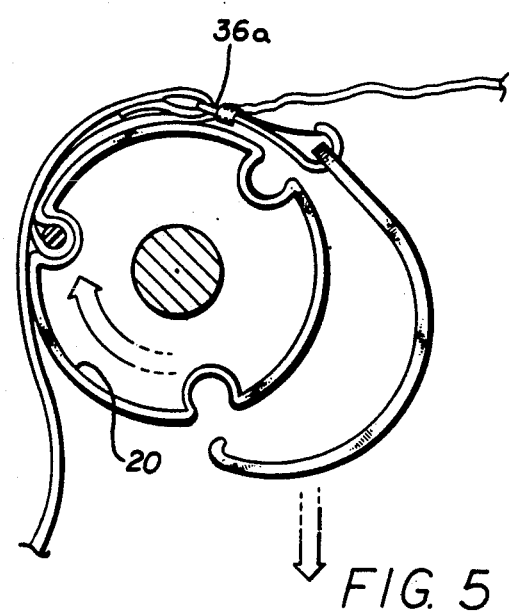
FIG. 5 is an end elevational view of the canopy roller tube depicting the device of the present invention disengaging from the tube.

FIG. 2 illustrates a preferred embodiment of the device of the present invention, which is designated generally as 2. Device 2 is arcuate shaped and includes a distal end 4 and a proximal end 6. Formed at the distal end 4 is a hook 8 and incorporated near the tip of proximal end 6 is an aperture 10.

Retractable awnings of the type disclosed in this application are typically mounted on a recreational vehicle 3 or the side of a building (not shown) and are used as protection against the elements, such as rain, sun, etc. Thus, consistent with the conventional arrangement of these types of awnings, the inward edge 12 of the canopy fabric 14 is attached to a mounting surface 16. Outer edge 18 of the canopy fabric 14 is attached to a roller tube 20, which is normally hollow and is used as a vehicle to roll out and wind up the fabric.

Formed longitudinally along the entire length of the roller tube 20 are a plurality of grooves 21. Connected at each end of the roller tube 20 are retractable support members 22, 24, which are connected at their opposite ends to the mounting surface 16. Additional retractable support members 26, 28 may also be provided to give more support to the canopy 14 when the canopy is rolled out to a full extension. Members 26, 28, when utilized, are attached to the mounting surface 16 at a location generally below the plane of the canopy 14 and extend at an upward angle therefrom towards end portions 30, 32, where they are attached to the roller tube 20. To provide even more support for the canopy 14, tie-downs 36, 38 can be attached to the respective end portions 30, 32 of tube 20 and, after the tie-downs undergo a certain amount of tensioning are anchored in the ground below.

In a typical application of device 2 of the present invention, canopy 14 is rolled out until fully extended. Support members 22, 24 and 26, 28 are simultaneously fully extended and secured. Referring to each tie-down separately, the top end 36a of tie-down 36 is attached to the device 2 by inserting a hook or some other attachment means at that end into the aperture 10 and securing it in place. The same procedure is utilized with tie-down 38 applied at the opposite end of the roller tube 20. Device 2 is then placed circumferentially around one end of the roller tube 20 to enable the hook 8 of the distal end 4 to engage a longitudinal groove 21 having a distinct normal or approximately normal orientation relative to the direction of the ground surface. Whether or not the tie-downs 36, 38 are adjusted prior to such engagement or just after, the important objective is to engage the groove 21 to enable the roller tube 20 to be rotated backwards a relatively short distance to eliminate any play in the tube's rotation and to draw the canopy taut. The groove 21 engaged by the hook 8, even after rotation, must remain oriented in a generally normal to the ground downward direction generally normal to the ground surface. Using the aid of gravitational forces, hook 8 will immediately slip from the groove and device 2 will fall completely free from the groove 21 the moment sufficient tension is released in the tie-down or anywhere else in the assembly. Tension in the assembly may be relieved in several ways. One example is the use of a mechanism that may be incorporated within or adjacent to the roller tube 20 to enable it to roll out or wind up the fabric 14. Thus, the act of initiating the winding up of the fabric will normally ease enough tension in the rotation of tube 20 enough to allow the hook 8 to easily fall free from the groove 21.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

I claim:

1. In combination with a retractable awning assembly, including a canopy having an outer edge and an inner edge, said canopy engageable along said inner edge to a support structure and along said outer edge to a cylindrical rotatable roller tube having, when in the deployed position, an inner surface generally in face to face spaced apart relation to said support structure, an outer surface generally facing away from said support structure and a plurality of longitudinally extending grooves therein, the canopy comprising fabric defining a plane when in the deployed position and being windable about said roller tube, said tube having first and second end portions, a plurality of parallel main support bars extending away from said support structure, each of which is connected to the respective said first and second end portions of said roller tube, a plurality of parallel support braces extending at an angle from said support structure at a location below the plane of said canopy, each of said support braces supporting the respective said first and second end portions of said roller tube, a device for use with an attached tie-down mechanism to give added support to the awning assembly for releasably maintaining the awning fabric in a taut condition, comprising:

a one-piece fastener means with a generally C-shaped configuration consisting of a circumferentially extending main section that partially encircles and coincides with an area approximating fifty percent of the circumference of the roller tube at the respective said first and second end portions thereof, said means each having a distal end and a proximal end with a hook portion integrated with the fastener means at the distal end only and a means at the proximal end attached to a tie-down means, such that the tie-down means overlaps a portion of the outer surface of said roller tube and combines with said one-piece fastener means to engage one of said longitudinal grooves and, in combination with the tightening of the tie-down means, is adapted to rotate said roller tube to draw the canopy fabric taut and thus, upon the lessening of a sufficient degree of tension in the canopy, said means disengages from the groove in the roller tube in a gravitational free fall.

2. The invention of claim 1 wherein said tie-down mechanism comprises a rope disposed vertically and a ground anchor attached thereto.

3. The invention of claim 1 wherein said fastener means is comprised of a metal alloy.

4. The invention of claim 1 wherein said means at the proximal end of the fastener means comprises an aperture.

5. The invention of claim 1 wherein said support structure constitutes a recreational vehicle.

6. The invention of claim 1 wherein said tie-down mechanism comprises a strap disposed vertically and a ground anchor attached thereto.

7. In combination with a retractable awning assembly, including a canopy having an outer edge and an inner edge, said canopy engageable along said inner edge to a support structure and along said outer edge to a cylindrical rotatable roller tube having, when in the deployed position, an inner surface generally in face to face spaced apart relation to said support structure, an outer surface generally facing away from said support structure and a plurality of longitudinally extending grooves therein, the canopy comprising fabric defining a plane when in the deployed position and being windable about said roller tube, said tube having first and second end portions, a plurality of parallel main support bars extending away from said support structure, each of which is connected to the respective said first and second end portions of said roller tube, a plurality of parallel support braces extending at an angle from said support structure at a location below the plane of said canopy, each of said support braces supporting the respective said first and second end portions of said roller tube, a device for use with an attached tie-down mechanism to give added support to the awning assembly for releasably maintaining the awning fabric in a taut condition, comprising:

a one-piece fastener means with a generally C-shaped configuration consisting of a circumferentially extending main section that partially encircles and coincides with an area approximating fifty percent of the circumference of the roller tube at the respective said first and second end portions thereof, said means each having a distal end and a proximal end with a hook portion integrated with the fastener means at the distal end only and a means at the proximal end attached to a tie-down means, such that the tie-down means overlaps a portion of the outer surface of said roller tube and combines with said one-piece fastener means to engage one of said longitudinal grooves having a normal orientation relative to the ground surface and, in combination with the tightening of the tie-down means is adapted to, rotate said roller tube no more than a quarter of a turn to draw the canopy fabric taut such that, upon the lessening of a sufficient degree of tension in the canopy, said means disengages from the groove in the roller tube in a gravitational free fall.

8. In combination with a retractable awning assembly, including a canopy having an outer edge and an inner edge, said canopy engageable along said inner edge to a support structure and along said outer edge to a cylindrical rotatable roller tube having, when in the deployed position, an inner surface generally in face to face spaced apart relation to said support structure, an outer surface generally facing away from said support structure and a plurality of longitudinally extending grooves therein, the canopy comprising fabric defining a plane when in the deployed position and being windable about said roller tube, said tube having first and second end portions, a plurality of parallel main support bars extending away from said support structure, each of which is connected to the respective said first and second end portions of said roller tube, a device for use with an attached tie-down mechanism to give added support to the awning assembly for releasably maintaining the awning fabric in a taut condition, comprising:

a one-piece fastener means with a generally C-shaped configuration consisting of a circumferentially extending main section that partially encircles and coincides with an area approximating fifty percent of the circumference of the roller tube at the respective said first and second end portions thereof, said means having a distal end and a proximal end with a hook portion integrated with the fastener means at the distal end only and a means at the proximal end for attachment to a tie-down means, such that the tie-down means overlaps a portion of the outer surface of said roller tube and combines with said one-piece fastener means to engage one of said longitudinal grooves and, in combination with the tightening of the tie-down means, rotate said roller tube to draw the canopy fabric taut such that, upon the lessening of a sufficient degree of tension in the canopy, said fastener means will disengage from the groove in the roller tube in a gravitational free fall enabling the canopy to be rolled up and retract against the support structure.

* * * * *